(12) United States Patent
Ballantine et al.

(10) Patent No.: US 7,179,554 B2
(45) Date of Patent: Feb. 20, 2007

(54) FUEL CELL SYSTEMS

(75) Inventors: Arne W. Ballantine, Round Lake, NY (US); Ron H. Farkash, Clifton Park, NY (US)

(73) Assignee: Plug Power Inc., Latham, NY (US)

( * ) Notice: Subject to any disclaimer, the term of this patent is extended or adjusted under 35 U.S.C. 154(b) by 911 days.

(21) Appl. No.: 09/896,268

(22) Filed: Jun. 29, 2001

(65) Prior Publication Data

US 2003/0003330 A1   Jan. 2, 2003

(51) Int. Cl.
*H01M 8/04* (2006.01)
*H01M 2/00* (2006.01)

(52) U.S. Cl. .............................. 429/13; 429/24; 429/26; 429/23; 429/34; 429/22

(58) Field of Classification Search ................ 429/13, 429/24, 26, 23, 34, 22
See application file for complete search history.

(56) References Cited

U.S. PATENT DOCUMENTS

| | | | |
|---|---|---|---|
| 3,801,372 A * | 4/1974 | Shaw | ........................ 429/13 |
| 3,877,989 A * | 4/1975 | Waldman et al. | ............. 429/19 |
| 5,047,298 A | 9/1991 | Perry, Jr. et al. | |
| 5,132,174 A | 7/1992 | Romanowski et al. | |
| 5,503,944 A | 4/1996 | Meyer et al. | |
| 5,910,378 A | 6/1999 | Debe et al. | |
| 6,048,635 A | 4/2000 | Guthrie | |
| 6,057,050 A * | 5/2000 | Parise | ........................... 429/7 |
| 6,087,028 A | 7/2000 | Goto | |
| 6,329,089 B1 * | 12/2001 | Roberts et al. | ............... 429/13 |
| 6,339,313 B1 | 1/2002 | Adams et al. | |
| 6,541,941 B2 | 4/2003 | Adams et al. | |
| 6,649,293 B1 * | 11/2003 | Jones | ......................... 429/26 |
| 6,686,080 B2 * | 2/2004 | Farkash et al. | ............... 429/26 |
| 2001/0036568 A1 * | 11/2001 | Farkash et al. | ............... 429/26 |
| 2001/0050191 A1 * | 12/2001 | Ogawa et al. | ............. 180/65.3 |
| 2002/0009623 A1 * | 1/2002 | St-Pierre et al. | ............... 429/13 |

FOREIGN PATENT DOCUMENTS

| | | |
|---|---|---|
| JP | 60177568 A | 9/1985 |
| JP | 09-045353 | 4/1997 |
| WO | WO 01/03219 A1 | 1/2001 |

* cited by examiner

*Primary Examiner*—Patrick Joseph Ryan
*Assistant Examiner*—Angela J. Martin
(74) *Attorney, Agent, or Firm*—Fish & Richardson P.C.

(57) ABSTRACT

A method of operating a fuel cell system having a fuel cell stack and a plurality of fuel cells associated with the fuel cell stack. The method includes monitoring an operating parameter associated with the fuel cell stack, and adjusting a temperature of the fuel cell stack based on the operating parameter.

32 Claims, 11 Drawing Sheets

FUEL CELL SYSTEMS

BACKGROUND

This invention relates to fuel cell systems.

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons are formed at the anode side of the membrane electrode assembly, indicating that the anode gas undergoes oxidation during the fuel cell reaction. Electrons are consumed at the cathode side of the membrane electrode assembly, indicating that the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \quad (1)$$

$$\tfrac{1}{2}O_2 + 2H^+ + 2e^- \rightarrow H_2O \quad (2)$$

$$H_2 + \tfrac{1}{2}O_2 \rightarrow H_2O \quad (3)$$

As shown in equation 1, the hydrogen is reacted to form protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water, or other non conducting fluid) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

FIG. 1 shows a fuel cell system 300 including a fuel cell assembly 302 having a plurality of fuel cells 304. Fuel cell system 300 also includes an anode gas supply 306, an anode gas inlet line 308, an anode gas outlet line 310, a cathode gas supply 312, a cathode gas inlet line 314, a cathode gas outlet line 316, a coolant inlet line 318, and a coolant outlet line 320.

To increase the electrical energy available, the plurality of fuel cells 304 can be arranged in series, to form a fuel cell stack 303. For example, one side of a flow field plate functions as the anode flow field plate for one fuel cell while the opposite side of the flow field plate functions as the cathode flow field plate in another fuel cell. This arrangement may be referred to as a bipolar plate. The stack may also include plates such as, for example, an anode coolant flow field plate having one side that serves as an anode flow field plate and another side that serves as a coolant flow field plate, e.g., a monopolar plate. As an example, the open-faced coolant channels of an anode coolant flow field plate and a cathode coolant flow field plate may be mated to form collective coolant channels to cool the adjacent flow field plates forming fuel cells.

Fuel cell stack 303 is typically provided with inlets, outlets, and manifolds for directing the flow of reactants and coolant to the appropriate flow plates, and assembled between a pair of thick rigid end plates, which are also provided with inlets and outlets. The end plate that is used to deliver one or more reactants to an end of the fuel cell stack is sometimes called a service end plate 321 (FIG. 2). The end plate at the opposite end of the fuel cell stack is sometimes called a blind end plate 323 (FIG. 2). The edges of the two end plates are bolted together to apply a compressive force on the fuel cell stack.

FIG. 2 is a partial schematic representation of fuel cell system 300 in operation. Anode gas supply 306, e.g., a reformer, provides in parallel hydrogen gas via inlet line 308 to the anodes of cells 1 through N, e.g., 88. At each cell, the anode converts the hydrogen into protons and electrons. The protons travel through the solid electrolyte and to the cathode of the respective cells. At cell 1, the electrons flow toward an external load. At the other cells, the electrons flow to the cathode of an adjacent fuel cell, toward the external load. Unreacted anode gas flows through the cells of fuel cell stack 303 through outlet 310.

Similarly, cathode gas supply 312, e.g., an air blower, provides in parallel oxygen (air) via inlet line 314 to the cathode of cells 1 through N. At each cell, the cathode forms water from the oxygen, protons from the respective anode, and electrons flowing from the external load (cell N) or adjacent anode (cell 1 through N−1). The water can be removed from stack 303 by the cathode gas stream. After flowing through the cells, the oxygen flows out of fuel cell stack 303 through outlet 316.

Thus, as the anode and cathode gases are supplied to fuel cell system 300, hydrogen and oxygen are converted into water, and electrons flow through the external load, thereby supplying electrical energy.

SUMMARY

The invention relates to fuel cell systems.

Without wishing to be bound to theory, it is believed that fuel cell stacks can be susceptible to loss of heat to the environment, e.g., due to radiative, convective, and/or conductive heat loss. As a result, during use, as relatively hot reactant(s) containing water passes through the fuel cell stack, and experiences a temperature drop, water from the reactant(s) can condense in the fuel cell stack. For example, hydrogen coming from a reformer can be relatively hot, e.g., about 65° C., and water-saturated, to minimizing drying out of the solid electrolyte in the fuel cell stack. In some embodiments, water may be added to the reactant(s) in a separate step, e.g., pre-humidification. As it enters the fuel cell stack, the hydrogen can experience a temperature drop to, e.g., about 60° C., and water can condense in the fuel cell stack.

As water condenses in the fuel cell stack, the water can block the flow channels and the solid electrolytes, and eventually flood the fuel cells in the stack. As fuel cells get blocked by water and flood, their voltages decrease, and overall performance of the fuel cell stack decreases.

Condensation of water can be particularly problematic when the fuel cell system is operating at low power. During operation at low power, gas flow or pressure through the fuel cell stack is relatively low, and the amount of heat generated by the cathodes in the fuel cell stack is also relatively low. As a result, condensation of water can be relatively high. In comparison, when the fuel cell system is operating at high power, gas flow or pressure and the amount of heat generated are relatively high, both of which can minimize condensation of water.

Moreover, condensation of water, which effectively reduces the water content in the humidified reactant(s), and can be comparable to operating the fuel cell system with sub-saturated reactants, can shorten the life of the solid electrolyte by drying out the solid electrolyte. This can reduce the electrical output and life of the fuel cell stack.

In certain embodiments, the invention features a method of operating a fuel cell system having a fuel cell stack and a plurality of fuel cells associated with the fuel cell stack. The method includes monitoring an operating parameter associated with the fuel cell stack, and adjusting a temperature of the fuel cell stack based on the operating parameter.

The operating parameter can be, for example, a voltage of a fuel cell, a power output from the fuel cell system, or a temperature of a fuel cell associated with the fuel cell stack.

Adjusting the temperature can include adjusting coolant flow through the fuel cell stack. Adjusting coolant flow can include restricting and/or unrestricting coolant flow through the stack, e.g., as a function of time and/or to cause the operating parameter to be a predetermined level. The predetermined level can be within about 15% of an operating parameter under normal operation of the fuel cell system.

The fuel cell system can further include a first end plate associated with a first end of the fuel cell stack, and the method can further include heating the first end plate. Heating the first end plate can include heating a first heating element different than the first end plate. The first heating element can be adjacent to the first end plate or be disposed between the first end plate and the fuel cell stack.

The method can further include flowing a fluid, e.g., a heated fluid, through a flow channel defined by the first end plate.

The method can further include heating, e.g., electrically, the first end plate with a heating element disposed on the first end plate, and/or heating a second end plate associated with the fuel cell stack. Heating the second end plate can include heating a second heating element different than the second end plate. The second heating element can be adjacent to the second end plate, e.g., between the second end plate and the fuel cell stack.

The method can be performed as a feedback loop.

In another aspect, the invention features a method of operating a fuel cell system having a fuel cell stack and a plurality of fuel cells associated with the fuel cell stack. The method includes monitoring voltages of a set of fuel cells, and restricting coolant flow through the fuel cell stack when one or more of the monitored voltages deviate from a predetermined voltage range.

Embodiments include one or more of the following features. The method can be performed as a feedback loop. The set of fuel cells includes all the fuel cells associated with the fuel cell stack. Restricting coolant flow is performed when one or more of the monitored voltages deviate by more than about 10% from an operating voltage under normal operation of the fuel cell system. The method further includes unrestricting coolant flow through the fuel cell stack, e.g., when the monitored voltages are in the predetermined voltage range and/or after a predetermined time of restricting coolant flow.

The method can further include monitoring an operating parameter of the fuel cell system, e.g., a power output of the fuel cell system, a temperature of the fuel cell stack, or a temperature of a first heatable element, and adjusting a temperature of the first end plate based on the operating parameter.

Adjusting the temperature can include heating a first heatable element and/or flowing a fluid through the first end plate. The heatable element can be adapted to heat an outer periphery of the fuel cell stack.

The method can further include adjusting a temperature of a second end plate associated with the fuel cell stack based on the operating parameter.

Loss of heat can be particularly high at the peripheries of the fuel cell stack, such as at the ends of the stack, e.g., near the end plates. This loss of heat is believed to result in the temperature of the fuel cell stack being non-uniform along the length of the fuel cell stack, and the ends of the fuel cell stack not being maintained at a desired operating temperature of the fuel cell stack. That is, the temperature of the ends at the fuel cell stack, particularly near the end plates, can be relatively lower than the temperature at the center of the fuel cell stack.

As a result, condensation of water can be particularly problematic for cell 1, which is located at the end of the fuel cell stack where heat loss is relatively high. Cell 1 is also adjacent to an already relatively cool service end plate (due to radiative heat loss). Furthermore, cell 1 has a cathode, which is where heat is generated during operation, that faces away from service end plate 120, vis-à-vis adjacent to the service end plate. Thus, cell 1 is not provided with heating that it may have, for example, if the cathode of cell 1 were adjacent to service end plate 120. Consequently, cell 1 can be relatively cooler, e.g., 2–4° C. cooler, than other cells in the fuel cell stack and be particularly susceptible to water condensation from water-containing, relatively hot reactant (s) passing through the inlets and outlets extending through service end plate 120.

In a situation sometimes called cell 1 tripping, as the flow channels and the solid electrolyte of cell 1 get blocked by water, and cell 1 floods, its voltage decreases, and overall performance of the fuel cell stack decreases. Meanwhile, cell 2 through cell N may continue to operate normally and to transfer electrons to the cathode of cell 1. As this continues, the polarity of the electrodes of cell 1 reverses from normal operating conditions, e.g., the cathode becomes negative, and/or the potential difference between the anode and the cathode of cell 1 can increase to relatively high oxidizing potentials, such as greater than about 0.6 Volts, or greater than about 1.23 Volts above a Standard Hydrogen Electrode (SHE). At these potentials, the anode of cell 1 can interact with water to produce protons, electrons and oxygen ($H_2O \rightarrow 2H^+ + 2e^- + \frac{1}{2}O_2$). The protons migrate toward the cathode of cell 1, and the electrons migrate toward the external load, as in the normal fuel cell process.

However, the relatively high oxidizing potential and the evolution of oxygen at the anode of cell 1 can oxidize and degrade materials in the fuel cell, such as, for example, certain catalysts (e.g., ruthenium), catalyst supports (e.g., carbon), and carbon in the gas diffusion layers. These oxidizing conditions can lead to irreversible damage to the electrodes and loss in fuel cell performance. Thus, cell 1 can act as the limiting cell in the fuel cell stack.

Moreover, as discussed above, cell 1 tripping can be particularly problematic when the fuel cell system is operating at low power. At low power, gas flow and/or the amount of heat generated by the cathodes in the fuel cell stack can be relatively low, and condensation of water can be relatively high.

In certain embodiments, the invention features a fuel cell assembly having heatable end(s), e.g., near the end plate(s). The heatable end(s) helps to maintain the temperature of the fuel cell stack at a desired temperature and uniform along the length of the stack. Condensation of water is, therefore, minimized, thereby minimizing cell 1 tripping. The fuel cell assembly can also be operated with saturated reactant(s), thereby minimizing drying out of the solid electrolyte. As a result, the performance and life of the fuel cell assembly can be enhanced.

In some embodiments, the positions of cell 1 and cell N are reversed. That is, cell 1 is positioned adjacent to the blind end plate, and the anode of cell 1 is adjacent to the blind end plate. Cell N is positioned adjacent to the service end plate, and the cathode of cell N is adjacent to the service end plate. In these embodiments, cell 1 adjacent to the blind end may experience tripping as described above, and one or more heatable elements may be used to minimize tripping.

In one aspect, the invention features a fuel cell assembly including a fuel cell stack, a first end plate associated with the fuel cell stack, and a first heatable element adapted to heat the first end plate.

Embodiments may include one or more of the following features.

The first heatable element is different than the first end plate, and the first heatable element disposed between the fuel cell stack and the first end plate. The first heatable element is adapted to be heated electrically. The first heatable element includes a temperature sensor and a resistive thermal device. The first end plate is heatable. The first end plate includes heating elements.

The fuel cell assembly can include a second end plate associated with the fuel cell stack, and a second heatable element adapted to heat the second end plate. The second end plate can be heatable. The second end plate can include a body defining a flow channel.

In another aspect, the invention features a method of operating a fuel cell system having a fuel cell stack and a first end plate associated with a first end of the fuel cell stack. The method includes heating the first end plate.

Embodiments may include one or more of the following features.

Heating the first end plate includes heating a first heating element different than the first end plate. The first heating element is adjacent to the first end plate or disposed between the first end plate and a fuel cell stack. The method further includes flowing a fluid, which can be heated, through a flow channel defined by the first end plate. The method further includes heating, e.g., electrically, the first end plate with a heating element disposed on the first end plate. The method further includes heating a second end plate associated with the fuel cell stack. Heating the second end plate includes heating a second heating element different than the second end plate. The second heating element can be adjacent to the second end plate or between the second end plate and the fuel cell stack.

In another aspect, the invention features a method of operating a fuel cell system having a fuel cell stack and a first end plate associated with the fuel cell stack. The method includes monitoring an operating parameter of the fuel cell system, and adjusting a temperature of the first end plate based on the operating parameter. The method can be performed as a feedback loop.

Adjusting the temperature can include heating a first heatable element and/or flowing a fluid through the first end plate.

The method can include adjusting a temperature of a second end plate associated with the fuel cell stack based on the operating parameter, e.g., power output of the fuel cell system, temperature of the fuel cell stack, or temperature of the first heatable element.

In another aspect, the invention features a fuel cell assembly having a fuel cell stack having a plurality of outer peripheries, e.g., an end or a side, and a heatable element adapted to heat an outer periphery of the fuel cell stack. The heatable element can be adapted to heat a plurality of outer peripheries.

In another aspect, the invention features a heatable end plate for use in compressing a fuel cell stack in a fuel cell assembly in which the heatable end plate includes a body having at least one flow channel.

In another aspect, the invention features a heatable end plate for use in compressing a fuel cell stack in a fuel cell assembly in which the heatable end plate includes a body and at least one of means for inhibiting condensation of water from at least one humidified reactant passable through at least one opening extending through the body, the at least one opening forming a portion of at least one inlet manifold for conducting the at least one humidified reactant to the fuel cell stack, and means for inhibiting heat loss from an end of the fuel cell stack.

In yet another aspect, the invention features a fuel cell assembly having a fuel cell stack, a first heatable end plate attachable to a second end plate for compressing the fuel cell stack therebetween, and wherein the first heatable end plate includes a first body having at least one first flow channel.

In yet another aspect, the invention features a fuel cell assembly having a fuel cell stack, and a first heatable end plate attachable to a second end plate for compressing the fuel cell stack therebetween. The first heatable end plate comprising a first body and at least one of first means for inhibiting condensation of water from at least one humidified reactant passable through at least one opening extending through the body, the at least one opening forming a portion of at least one manifold for conducting the at least one humidified reactant to the fuel cell stack, and first means for inhibiting heat loss from a first end of the fuel cell stack.

In another aspect, the invention features a method for operating a fuel cell assembly. The method includes providing a fuel cell assembly having a fuel cell stack disposed between a first end plate and a second end plate, and heating the first end plate to at least one of inhibit condensation of water from at least one humidified reactant passing through at least one opening extending through the first end plate, the at least one opening forming a portion of at least one inlet manifold for conducting the at least one humidified reactant to the fuel cell stack, and inhibit heat loss from a first end of the fuel cell stack.

Other features, objects, and advantages of the invention will be apparent from the description and drawings, and from the claims.

DETAILED DESCRIPTION

Figure 1:
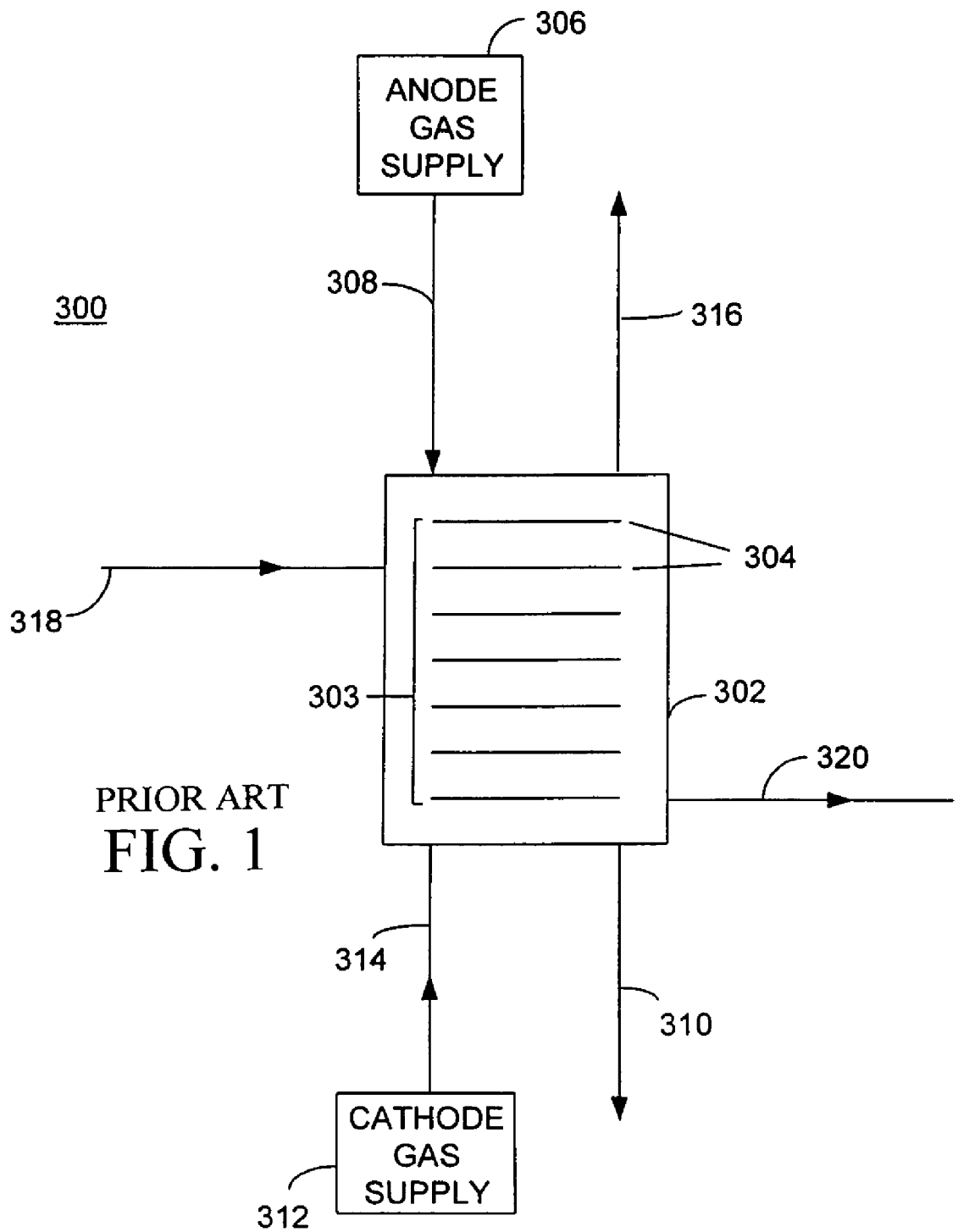
FIG. 1 is a partial schematic diagram of an embodiment of a fuel cell system.
Figure 2:
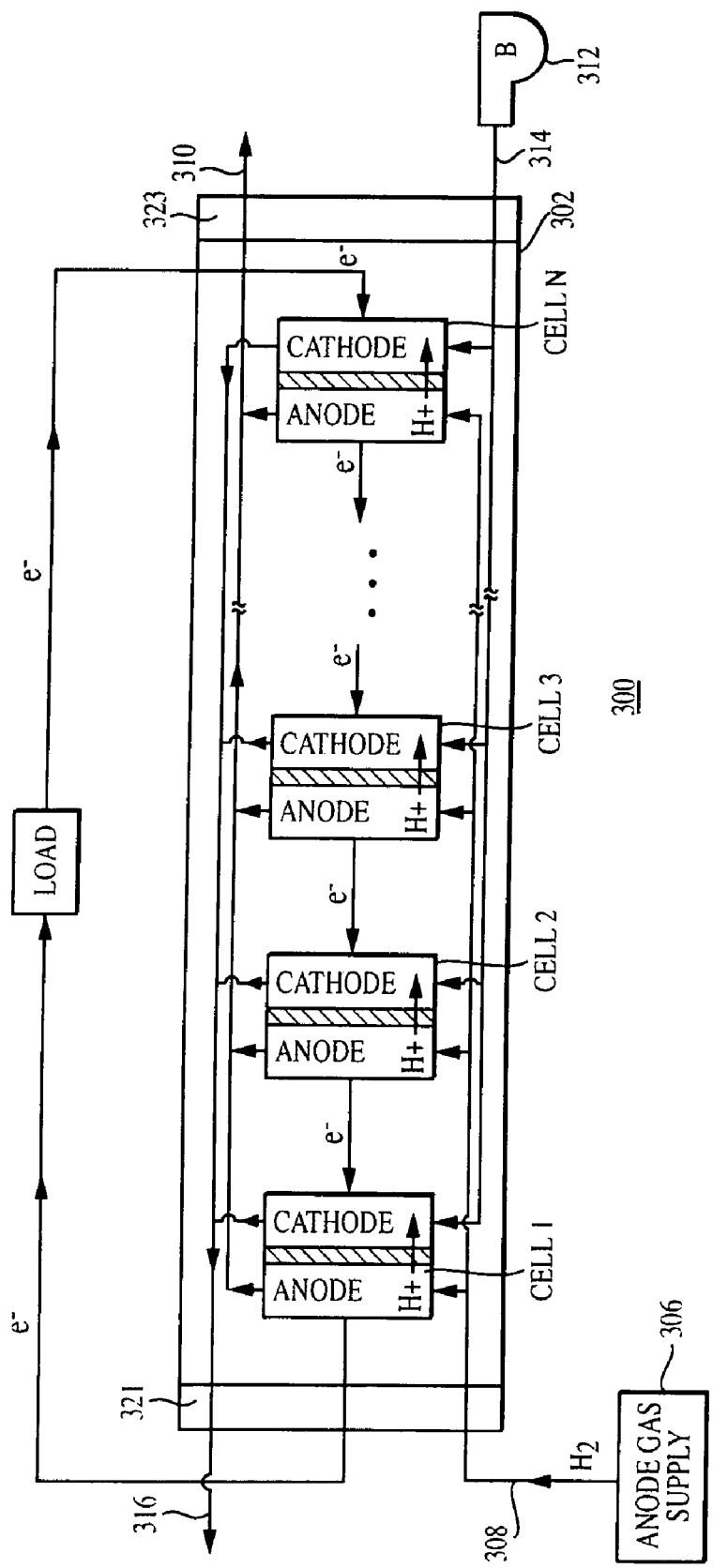
FIG. 2 is a partial schematic diagram of an embodiment of a fuel cell system.
Figure 3:
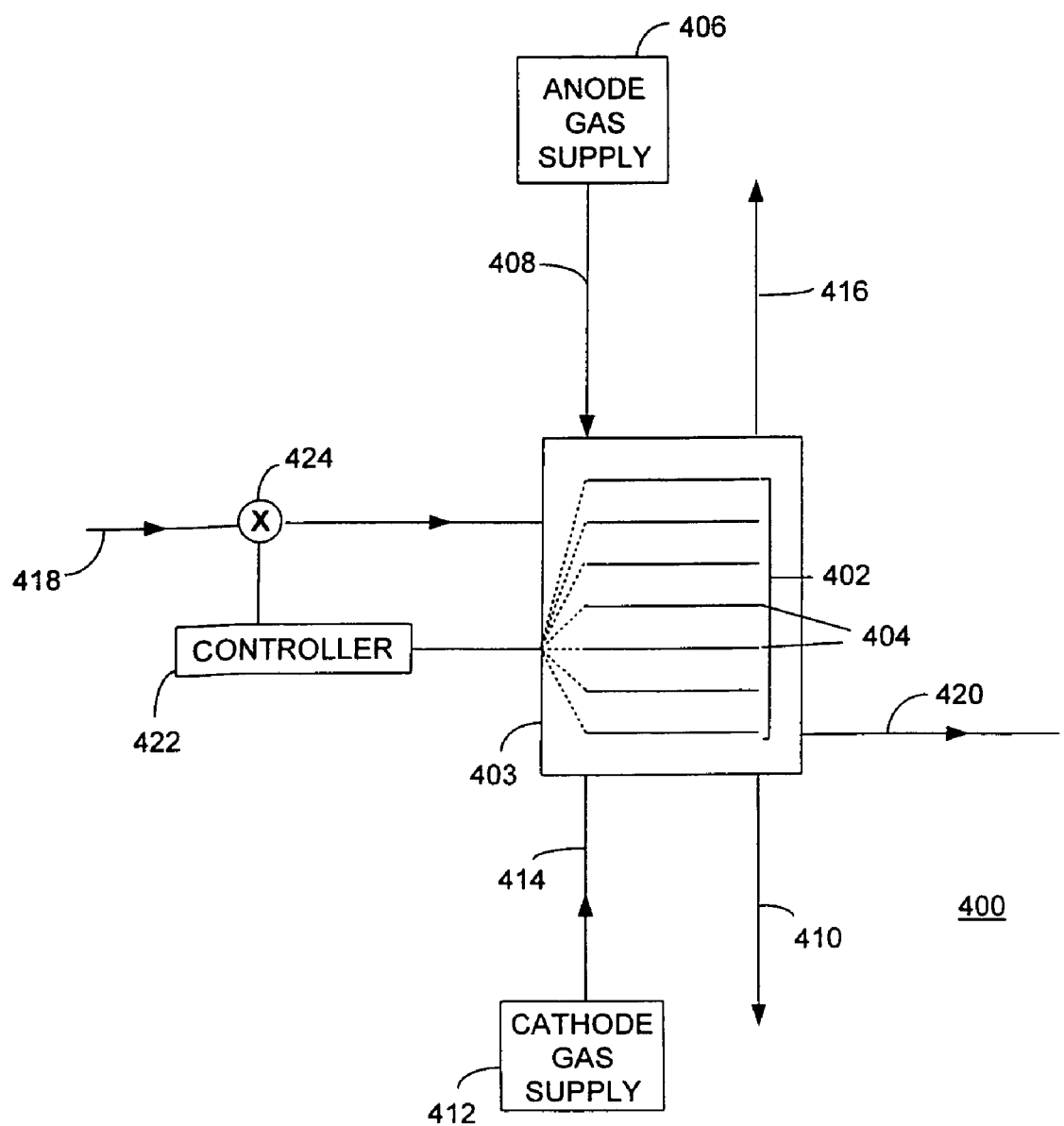
FIG. 3 is a partial schematic diagram of an embodiment of a fuel cell system.

FIG. 3 shows a fuel cell system 400 including a fuel cell assembly having a fuel cell stack 402 composed of a plurality of fuel cells 404, e.g., eighty-eight fuel cells arranged in series. Fuel cell system 400 also includes an anode gas supply 406, an anode gas inlet line 408, an anode gas outlet line 410, a cathode gas supply 412, a cathode gas inlet line 414, a cathode gas outlet line 416, a coolant inlet line 418, and a coolant outlet line 420. System 400 further includes a controller 422 and a valve 424 that provide a mechanism for managing water in fuel cell stack 402, e.g., reduces condensed water in the stack to enhance performance of the stack.

Controller 422, e.g., a computer or a microprocessor, is generally adapted to regulate the flow of coolant through fuel cell stack 402, e.g., based on a detected performance parameter of the fuel cell stack. By regulating the flow of coolant through fuel cell stack 402, e.g., by closing or opening valve 424, controller 422 can regulate, e.g., increase or decrease, the internal temperature of the stack. This, in turn, can provide a method of operating fuel cell system 400 such that condensation of water in stack 402 can be minimized or regulated to enhance performance of the stack.

More specifically, condensed water in fuel cell stack 402 can be removed and/or the amount of condensed water can be minimized by restricting, e.g., reducing or stopping, coolant flow through the stack. By restricting coolant flow through stack 402, and for example, keeping other operating parameters of the stack unchanged, the internal temperature of the stack typically increases because there is less coolant flowing through the stack. The dew points of fuel cell gases entering the stack, however, remain substantially unchanged. Since the internal temperature, or dry bulb temperature, of the stack has increased, the fuel cell gases now have increased water carrying capacities, compared to the same gases at a lower dry bulb temperature. The increased capacities allow the gases to effectively remove water condensed in the stack and/or to minimize water condensation in the stack with minimal disruptions to the operation of the fuel cell system.

Generally, restricting coolant flow affects all the fuel cells 404 in stack 402 because the coolant flows through the entire stack. Water can be removed and/or condensation can be minimized from one fuel cell, any combination of fuel cells or all the fuel cells by regulating coolant flow through the coolant inlet line. It is believed that the degree of water removal is proportional to the amount of water condensed in a fuel cell. That is, the more condensed water a cell has, the more the cell responds to coolant flow restriction, thereby providing a self-selecting process in which the cell(s) that needs the most water removal benefits the most from coolant flow restriction. The cell(s) that are not flooded or that do not have substantial amounts of condensed water operate substantially unchanged during coolant flow restriction.

After a period of coolant flow restriction, coolant flow can then be resumed, e.g., unrestricted, at a predetermined time to allow the coolant to conduct heat away from fuel cells 404 and prevent stack 402 from overheating. Coolant flow can be resumed to its pre-restricted flow or to a different flow rate. Generally, coolant flow restriction should be monitored to minimize drying out the electrolyte and overheating of stack 402.

Referring again to FIG. 3, in one embodiment, controller 422, valve 424, and stack 402 operate in a feedback loop to control coolant flow to the stack. Controller 422 receives as inputs voltage measurements of fuel cells 404. The voltage of a cell can be indicative of its performance, e.g., flooded cells typically have decreased voltages compared to cells that are not flooded. In response to these inputs, controller 422 regulates coolant flow to stack 402 by adjusting valve 424 located along coolant inlet line 418. This, in turn, regulates the dry bulb temperature of stack 402, as described above. As the amount of condensed water in the stack responds to changes in the dry bulb temperature, this response is reflected in the voltage measurements, which are fed back to controller 422 to regulate coolant flow accordingly.

For example, controller 422 can be configured, e.g., programmed, to monitor the operating voltages of fuel cells 404, e.g., the controller can detect eighty-eight voltage measurements from eighty-eight fuel cells in the stack. Under one operating condition, the fuel cells can be operating within an acceptable or desirable voltage range, for example, in the range of about 0.58 Volt to about 0.62 Volt per cell, with an average voltage ($V_{avg}$) of about 0.60 Volt per cell. As one or more cells collect condensed water and/or flood, the performance of the cell(s) decreases, which is indicated by the voltage(s) of these cell(s) typically decreasing from the acceptable or desirable voltage range.

In one method of operation, controller 422 can be configured to restrict coolant flow when it detects, from one or more of the monitored fuel cells, a minimum voltage ($V_{min}$) that deviates from the average voltage by a predetermined value, e.g., greater than about 15% or greater than about 20%. That is, using the example above where $V_{avg}$ is about 0.60 Volt, controller 422 can restrict coolant flow when it detects one or more $V_{min}$ of about 0.48 to about 0.51 Volt. In other embodiments, controller 422 can be configured to restrict coolant flow when it detects a minimum voltage, or a predetermined number of minimum voltages, equal to a predetermined voltage, which may not be a function of the operating voltage range or the average voltage.

As described above, as coolant flow is restricted, the dry bulb temperature of stack 402 increases. As a result, condensation of water is minimized, and/or condensed water is removed by fuel cell gases, which typically increases cell voltages, e.g., back to the desired operating voltage range. Thus, controlling coolant flow provides a mechanism for recovering, for example, flooded cell(s) back to a desired level of performance.

The changes in cell voltages are fed back to controller 422 to control coolant flow according to a desired method of operation, e.g., further restricting coolant flow until the desired voltages are achieved or reinitiating coolant flow. For example, coolant flow can then be reinitiated by controller 422 when the monitored voltages are all within a desirable operating range, e.g., about 0.58–0.62 Volt. Alternatively, or in addition, coolant flow can be reinitiated after a predetermined amount of time of restricted coolant flow.

In other embodiments, controller 422 is configured to monitor other operating parameters, such as, for example, the power output of the stack or the temperatures of fuel cells 404, which can be indicative of possible water condensation. Fuel cell system 400 can be adapted to automatically or periodically restrict coolant flow, e.g., for a predetermined amount of time, during low power operation, when water condensation can be particularly problematic. Fuel cell system 400 can be adapted to restrict coolant flow according to a predetermined schedule, e.g., to purge the system of condensed water, with or without monitoring any operating parameters of the fuel cells.

In other embodiments, other methods can be used to regulate coolant flow including, for example, changing the speed of a coolant pump or momentarily turning off the coolant pump.

In some embodiments, fuel cell assembly 403 can be replaced with, or modified to include features from, fuel cell assemblies described below having one or more heatable peripheries, e.g., heatable end(s), to further provide fuel cell systems having enhanced management of water condensation.

Figure 4:
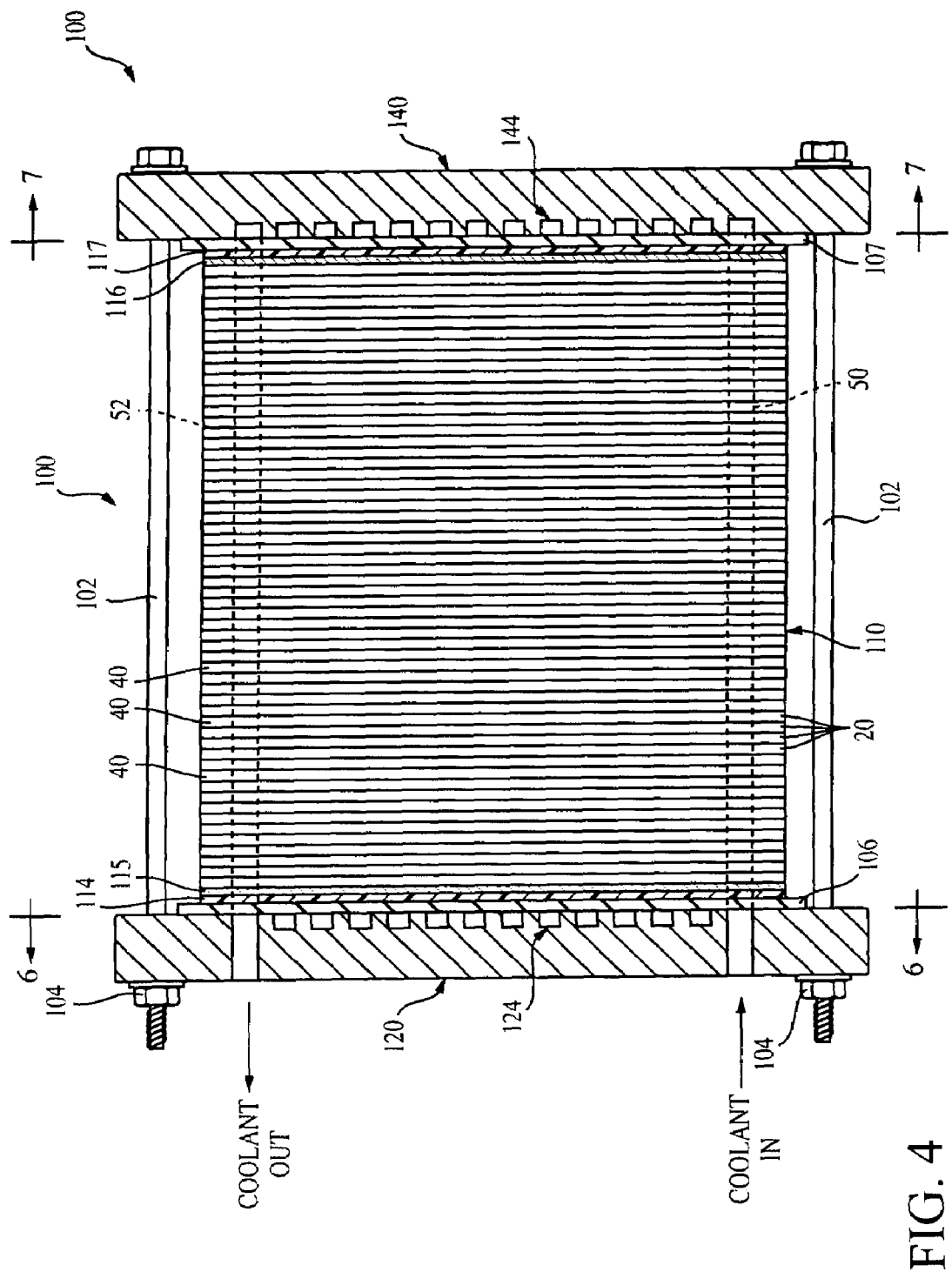
FIG. 4 is a side elevational view, in part cross-section, of an embodiment of a fuel cell assembly having end plates.

FIG. 4 shows a fuel cell assembly 100 having a fuel cell stack 110 compressed between a service heatable end plate 120 and a blind heatable end plate 140. Heatable end plates 120 and 140 can be heated to inhibit condensation of water from humidified reactants passing through heatable end plate 120 and/or to inhibit heat loss from the ends of fuel cell stack 110.

Fuel cell stack 110 includes a plurality of fuel cells 20, and a plurality of cooling plates 40 interspersed between the plurality of fuel cells 20 and through which a coolant is recirculated to maintain fuel cell stack 110 at a generally constant operating temperature. Insulation layers 114 and 117, and current collector/conductor plates 115 and 116, are disposed between respective end plates 120 and 140 and the opposite ends of fuel cell stack 110. A plurality of structural members such as elongated bolts 102 and releasably attachable nuts 104 inhibit movement of end plate 120 away from end plate 140.

Figure 5:
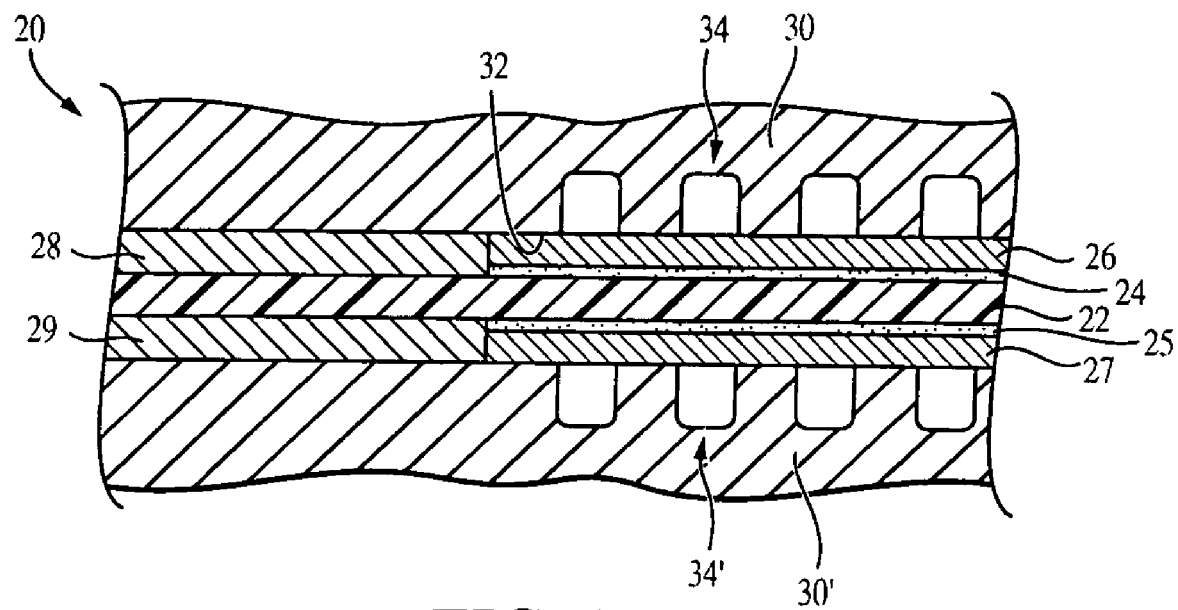
FIG. 5 is a cross-sectional view of an embodiment of a fuel cell.

FIG. 5 shows an embodiment of a fuel cell 20. Fuel cell 20 includes catalysts 24 and 25 (e.g., platinum) that facilitate fuel cell chemical reactions and are applied to the anode and cathode sides, respectively, of a solid polymer electrolyte 22, such as a solid polymer membrane or a proton exchange membrane (PEM) (e.g., a material available from E.I. Du Pont de Nemours Co. under the trademark NAFION®). Anode and cathode gas diffusion layers 26 and 27, which are formed from a resilient and conductive material such as carbon fabric or carbon fiber paper, are disposed on catalysts 24 and 25, respectively.

Fuel cell 20 further includes a first fluid flow plate 30 having a fluid flow surface 32 with a plurality of flow channels 34 defined thereon. Flow channels 34 receive and conduct a reactant through an inlet and out an outlet that are in fluid communication with and open onto corresponding passageways (not shown in FIG. 5), respectively, in fluid flow plate 30 which form respective portions of manifolds (not shown in FIG. 4) in fuel cell stack 110 (FIG. 4). Fluid flow plate 30 may be monopolar or bipolar.

Flow channel 34 carries a reactant, e.g., a fuel such as hydrogen, as well as a liquid, e.g., for humidification. A second fluid flow plate 30', is essentially similar to first fluid flow plate 30, includes flow channels 34' for carrying a reactant, e.g., an oxidant such as air/oxygen as well as a liquid, e.g., humidification and/or product water.

Gaskets 28 and 29 are preferably used to seal the passageways forming the portions of the manifolds. Gaskets 28 and 29 may include a frame gasket made from a polytetrafluoroethylene (PTFE) material manufactured by E. I. Du Pont de Nemours Company and sold under the trademark TEFLON®. In other embodiments, multiple O-ring gaskets may be used.

Referring again to FIG. 4, fuel cell stack 110 may contain one or more PEM-type fuel cells 20. By connecting an external load (not shown) between electrical contacts (not shown) of current collector/conductor plates 115 and 116, one can complete a circuit for use of current generated by the one or more PEM-type fuel cells.

PEM-type fuel cell stack 110 is desirably suitably cooled to operate at a temperature between about 20° C., i.e., ambient, and about 110° C., and preferably between about 70° C. and about 110° C. In addition, in the fabrication of fuel cell assembly 100, fuel cell stack 110 typically has applied thereto a stack compression pressure of between about 25 psi (pounds per square inch) and about 1,000 psi, and preferably, between about 100 psi and about 600 psi.

Figure 6:
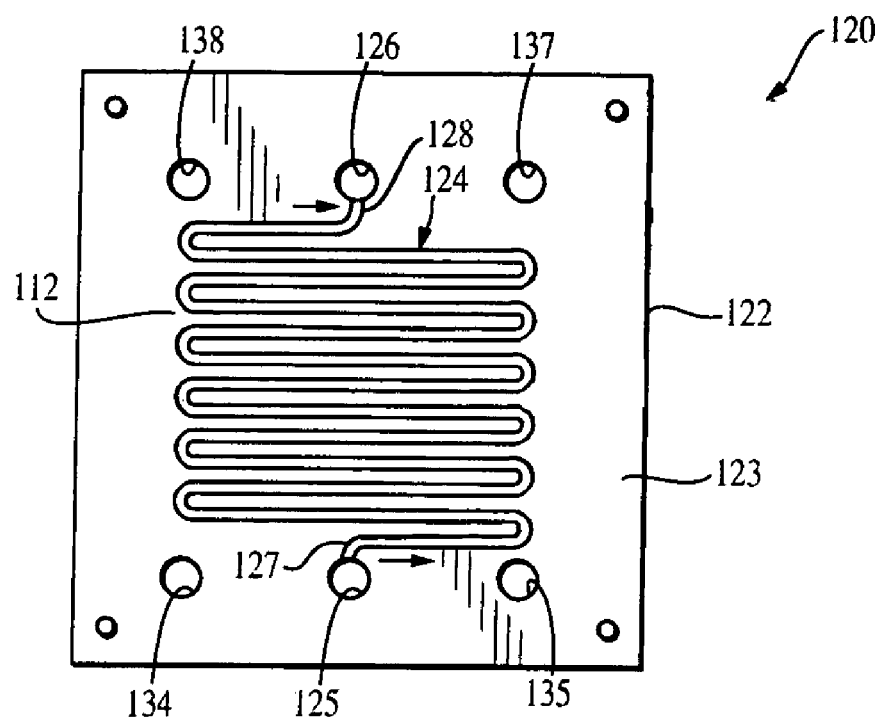
FIG. 6 is a view taken along line 6—6 of a service end plate of FIG. 4.

Referring to FIGS. 4 and 6, service end plate 120 includes a body 122 having a surface 123 that is engageable with a first end of fuel cell stack 110 (FIG. 4). Body 122 of end plate 120 includes a first opening 134 extending therethrough for forming a portion of an inlet fuel manifold for conducting humidified fuel to fuel cell stack 110 (FIG. 4), and a second opening 135 extending therethrough for forming a portion of an inlet oxidant manifold for conducting humidified oxidant to fuel cell stack 110 (FIG. 4). In addition, a third opening 137 extends through body 122 for forming a portion of an outlet fuel manifold for conducting exhaust fuel from fuel cell stack 110 (FIG. 4), and a fourth opening 138 extends through body 122 for forming a portion of an outlet oxidant manifold for conducting exhaust oxidant from fuel cell stack 110 (FIG. 4). Body 122 also includes a fifth opening 125 extending therethrough for forming a portion of an inlet coolant manifold 50 for conducting coolant to fuel cell stack 110 and a sixth opening 126 extending therethrough for forming a portion of an outlet coolant manifold 52 for conducting coolant from fuel cell stack 110 (FIG. 4).

In addition, surface 123 includes at least one flow channel 124 having an inlet portion 127 which opens onto fifth opening 125 and an outlet portion 128 which opens onto sixth opening 126 for conducting coolant across surface 123 for heating end plate 120. Preferably, flow channel 124 extends over substantially an entire portion of surface 123 corresponding to an active or working area of fuel cell stack 110 (FIG. 4). The active or working area of the fuel cell stack corresponds to about the area covered by the catalysts 24 and 25 and solid polymer electrolyte 22.

Figure 7:
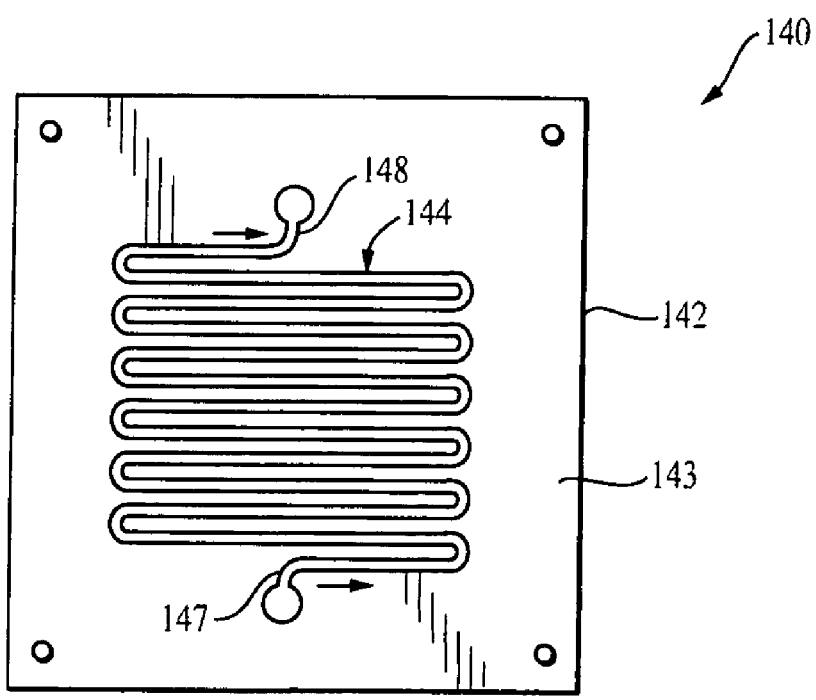
FIG. 7 is a view taken along line 7—7 of a blind end plate of FIG. 4.

Referring to FIG. 7, blind end plate 140 includes a body 142 having a surface 143 that is engageable with an opposite second end of fuel cell stack 110. Surface 143 includes at least one flow channel 144 for heating end plate 140. Preferably, flow channel 144 extends over substantially an entire portion of surface 143 corresponding to the active or working area of fuel cell stack 110 and includes inlet and outlet portions 147 and 148, which open onto coolant manifolds 50 and 52, respectively, formed in fuel cell stack 110 (FIG. 4).

Flow channels 124 and 144 are formed or machined into the surface of the body so as to be integral with the body of the service and blind end plates 120 and 140, respectively.

Referring to service end plate 120 (FIG. 6), coolant in fifth opening 125, which forms a portion of the inlet coolant manifold of the fuel cell stack, enters inlet portion 127 of flow channel 124, then travels through flow channel 124, and exits via outlet portion 128 through sixth opening 126, which forms a portion of the outlet coolant manifold of the fuel cell stack. Similarly, referring to blind end plate 140 (FIG. 7), coolant enters inlet portion 147, which opens onto a portion of the inlet coolant manifold of the fuel cell stack, then travels through flow channel 144, and exits via outlet portion 148 which opens onto a portion of the outlet coolant manifold of the fuel cell stack. With this configuration of the end plates, the temperature of the coolant introduced into end plates 120 and 140 can be substantially equal to the operating temperature of the fuel cell stack, e.g., within a few degrees Celsius or within one degree Celsius, so that both the fuel cell stack and the end plates or the desired surfaces and/or portions of the end plates are maintained at substantially the same temperature as the fuel cell stack.

Figure 8:
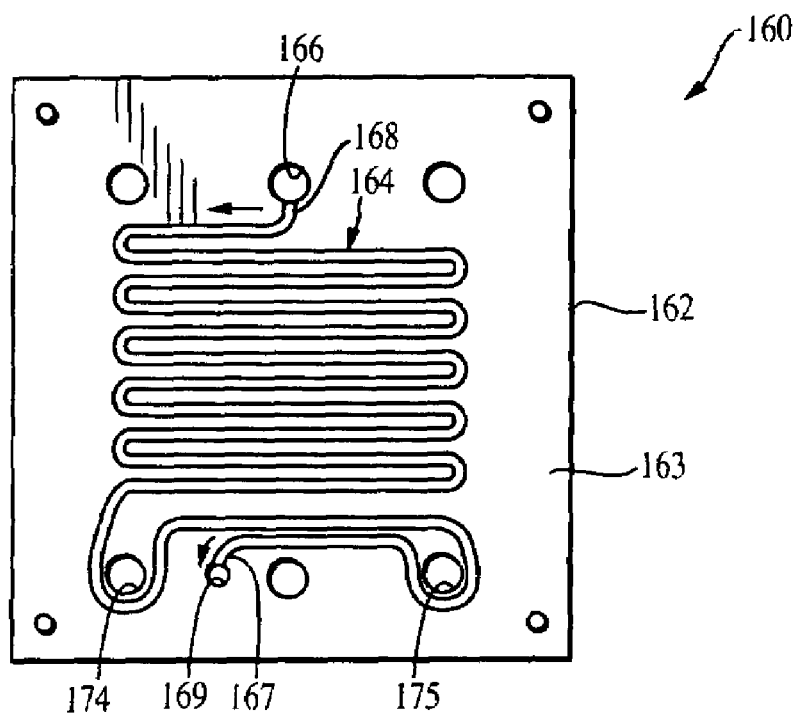
FIG. 8 is an elevational view of an embodiment of a service end plate.

FIG. 8 shows an embodiment of a service end plate 160 including a body 162 having a surface 163 that defines at least one flow channel 164 that extends and is disposed around a first opening 174 and a second opening 175. Openings 174 and 175 define a portion of an inlet fuel manifold and a portion of an inlet oxidant manifold, respectively, in fuel cell stack 110 (FIG. 4). In addition, flow channel 164 includes a first end portion 168 which opens onto an opening 166 which forms a portion of outlet coolant manifold 52 (FIG. 4) of fuel cell stack 110 (FIG. 4), and a second end portion 167 which opens onto a discharge opening 169.

Coolant from the outlet coolant manifold enters opening 166 and end portion 168 of flow channel 164, then travels through flow channel 164, and exits via discharge opening 169. Discharge opening 169 is suitably connected via a conduit to a heat exchanger used for cooling the coolant passing through the fuel cell stack, or alternatively, a separate heat exchanger. Similarly, a blind end plate may be configured to pass coolant from the outlet coolant manifold through the blind end plate. With this configuration of the end plate, the temperature of the coolant introduced into the end plates can closely approach the maximum operating temperature of the fuel cell stack, e.g., within a few degrees Celsius or within one degree Celsius, so that both the fuel cell stack and the end plates or the desired surfaces and/or portions of the end plates are maintained at substantially the same temperature as the fuel cell stack.

In other embodiments, one or both end plates 120 and 140 may have separate inlet and outlet openings that connect to the flow channel in the end plates and that do not connect to the inlet or outlet coolant manifold of the fuel cell stack so that a separately-heated fluid may be used, e.g., a heated fluid which is not mixed with the coolant passing through the fuel cell stack.

Referring again to FIG. 4, a pair of plates 106 and 107 are disposed between insulation layers 114 and 117 and end plates 120 and 140 to provide a seal for flow channels 124 and 144, respectively. In certain embodiments, suitable insulation layers may provide the necessary sealing of the outer portion of flow channel 124 and 144, thereby eliminating the need for plates 106 and 107. Providing flow channels on the end plates and eliminating plates 106 and 107 result in a compact fuel cell assembly design, a reduction in manufacturing costs, and an efficient transfer of heat from the fluid, e.g., coolant and separately-heated fluid, to the end plate and to the ends of the fuel cell stack. End plate 120 and end plate 140 can be formed from a metal, such as steel, or from a plastic, such as polypropylene.

In some embodiments, suitable insulation layers may be provided between the ends of the fuel cell stack and the end plates so that the operating temperature of the fuel cell stack is generally constant along its length and so that the at least one flow channel of the service end plate does not extend over the active or working area of the fuel cell. Instead, the flow channel extends around the inlet fuel opening and/or the inlet oxidant opening in the service end plate, and/or is disposed adjacent to the inlet fuel opening and/or the inlet oxidant opening in the service end plate to inhibit condensation of the humidified reactant conducted through the inlet fuel opening and/or inlet oxidant opening.

While the flow channels of the end plates are shown as a single flow channel extending from an inlet opening to an outlet opening and across the surface of the body of the end plate, in some embodiments, multiple or a plurality of flow channels may extend from the inlet opening to the outlet opening. The flow channels may be configured as passageways extending through the body of the end plate, or a combination of flow channels on a surface and passageways extending through the body of the end plate. When coolant is used, the flow channel(s) and/or passageway(s) in the end plates are sized and configured so that desired flow is conducted through the end plates as well as the cooling plates interspersed between the fuel cells throughout the length of the fuel cell stack, e.g., so as to not short circuit the flow of coolant through the end plates.

Figure 9:
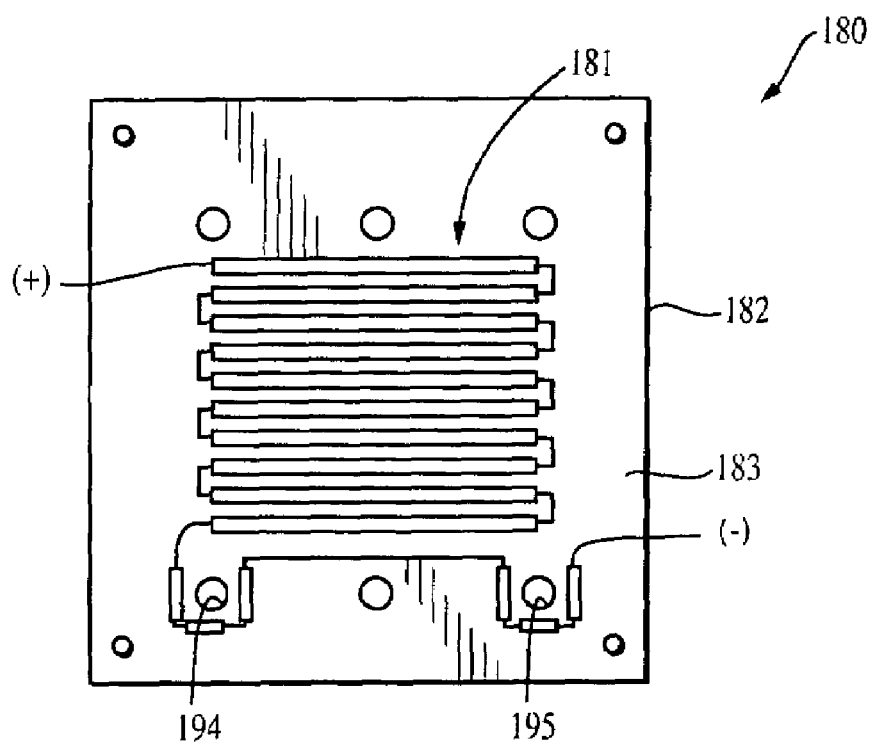
FIG. 9 is an elevational view of an embodiment of a service end plate.

FIG. 9 shows another embodiment of a service end plate 180 comprising a body 182 having a surface 183 having disposed thereon a plurality of heating elements 181 for transforming electrical energy into heat, to heat end plate 180 to inhibit condensation of the humidified reactant(s) passing through end plate 180 and/or to inhibit heat loss from the end of a fuel cell stack. Heating elements 181 can extend similarly to the flow channels described above, e.g., over substantially an entire portion of surface 183 corresponding to an active area of a fuel cell stack and around an inlet fuel opening 194 and/or an inlet oxidant opening 195. Heating element 181 may be one member that extends over the surface of service end plate. A heatable blind end plate may include heating element(s) 181 described above.

The plurality of heating elements 181 are suitably connected to an electrical power supply that is desirably connected to suitable heat sensors for controllably regulating the supply of electrical power to heating elements 181 to maintain end plate 180 or at least the surface of the end plate at the operating temperature of the fuel cell stack. The plurality of heating elements may include suitable electrical resistance heating tape applied to the surface of the end plate corresponding to the active or working area of the fuel cell and/or around one or more of the inlet reactant openings. Similarly, a blind end plate may include a plurality of heating elements extending along the surface of the end plate corresponding to the active or working area of the fuel cell stack. In some embodiments, heating elements may be disposed within or embedded in the body of the end plate.

In certain embodiments, the fuel cell assemblies and systems described above can be supplemented with one or more heating elements located between the heatable end plates and the fuel cell stack. The heating element(s), for example, can be used to further heat the end plate(s) and gases entering the fuel cell stack. In some embodiments, the heating element(s) can be incorporated in fuel cell systems without heatable end plates.

Figure 10:
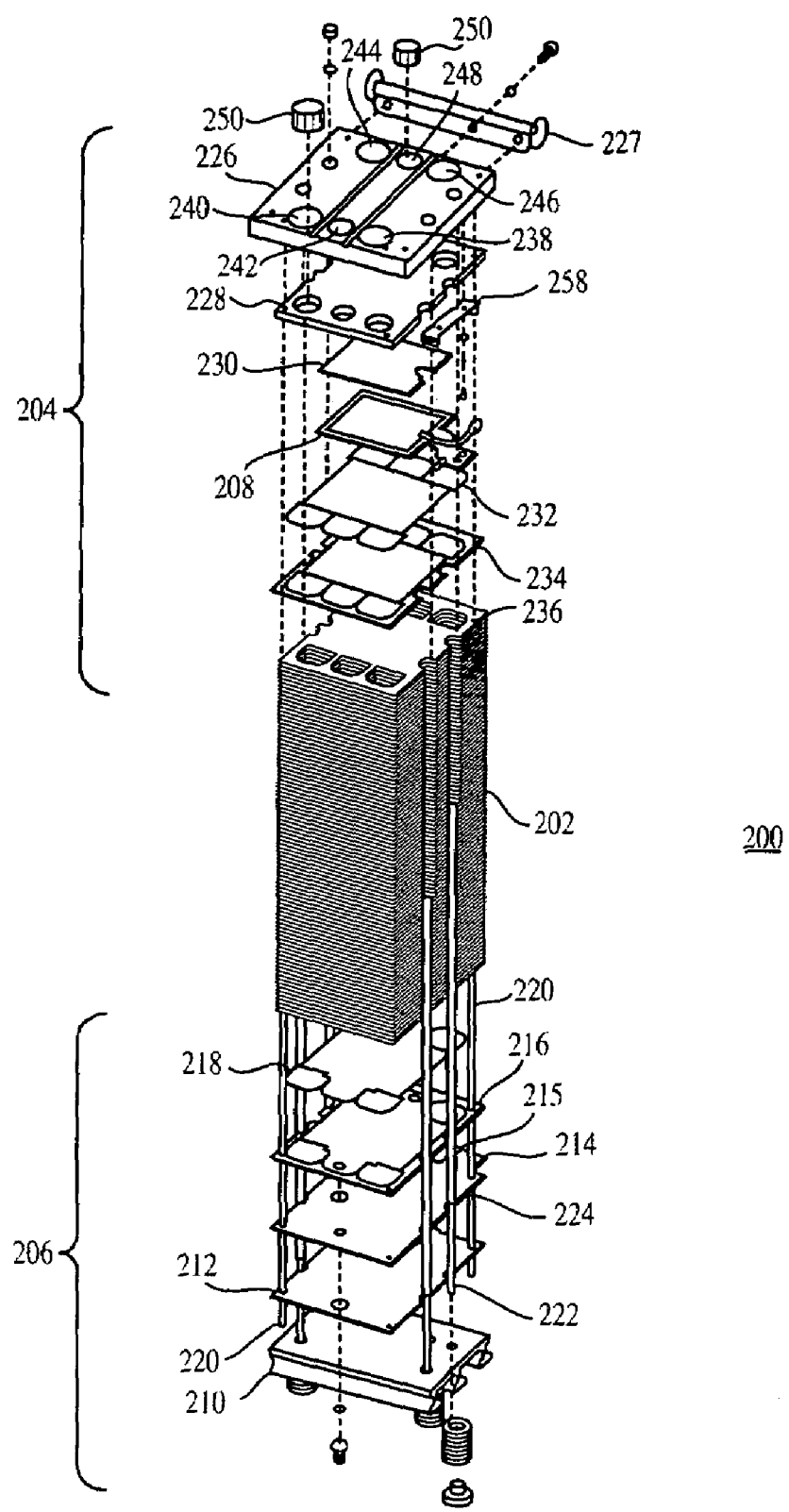
FIG. 10 is an exploded view of an embodiment of a fuel cell assembly, shown upside down.

FIG. 10 shows another embodiment of a fuel cell assembly 200 having a fuel cell stack 202 between a service end assembly 204 and a blind end assembly 206. Service end assembly 204 includes a heatable current collector plate 208 that can heat a service end plate 226 and incoming saturated fuel and oxidant gases, thereby minimizing condensation of water on cell 1, the fuel cell adjacent to service end assembly 204.

Blind end assembly 206 includes a blind end plate 210, a heat and current insulator 212, a current collector plate (e.g., a gold-coated copper plate) 214 defining a positive electrical contact 215, a cooler blank plate (e.g., a graphite-polymer composite plate) 216, and an anode cooler gasket 218. Blind end assembly 206 is aligned and secured by alignment rods 220 and threaded rods 222, which are covered by insulating sleeves 224.

Fuel cell stack 202 includes a plurality of fuel cells, e.g., eighty-eight cells, arranged in series as described above. Fuel cell stack 202 is also aligned and secured by alignment rods 220 and threaded rods 222.

Figure 16:
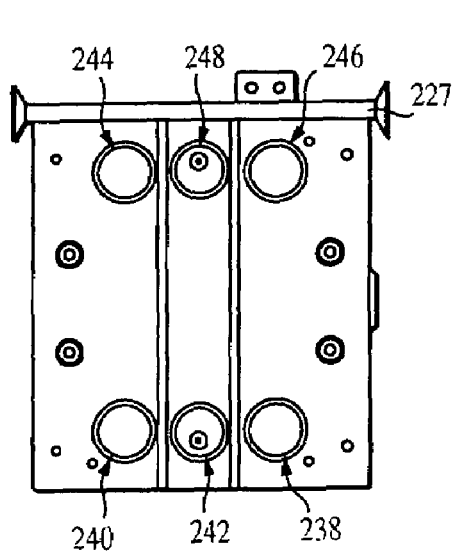
FIG. 16 is a bottom end view of the assembled fuel cell assembly of FIG. 10.
Figure 17:
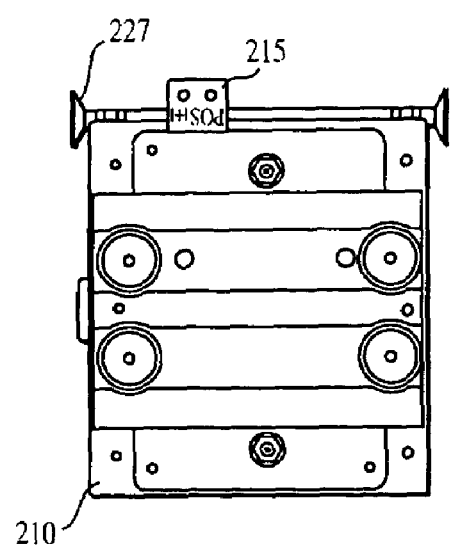
FIG. 17 is a top end view of the assembled fuel cell assembly of FIG. 10.

Service end assembly 204 includes a service end plate 226 having a manifold/stack hinge weldment 227, a heat and current insulator 228, a shim 230, heatable collector plate 208, a cathode cooler gasket 232, a cooler blank plate 234, and a gasket 236. Service end plate 226 defines an anode inlet 238, a cathode inlet 240, a coolant inlet 242, an anode outlet 244, a cathode outlet 246, and a coolant outlet 248 (FIG. 16). Service end assembly 204 further includes seals 250 (only two shown for clarity) that are used to connect gas tubing and coolant tubing to their appropriate inlets and outlets. Similar to blind end assembly 206, service end assembly 204 is also aligned and secured by rods 220 and 222. FIGS. 13–16 show fuel cell assembly 200 assembled.

Figure 11:
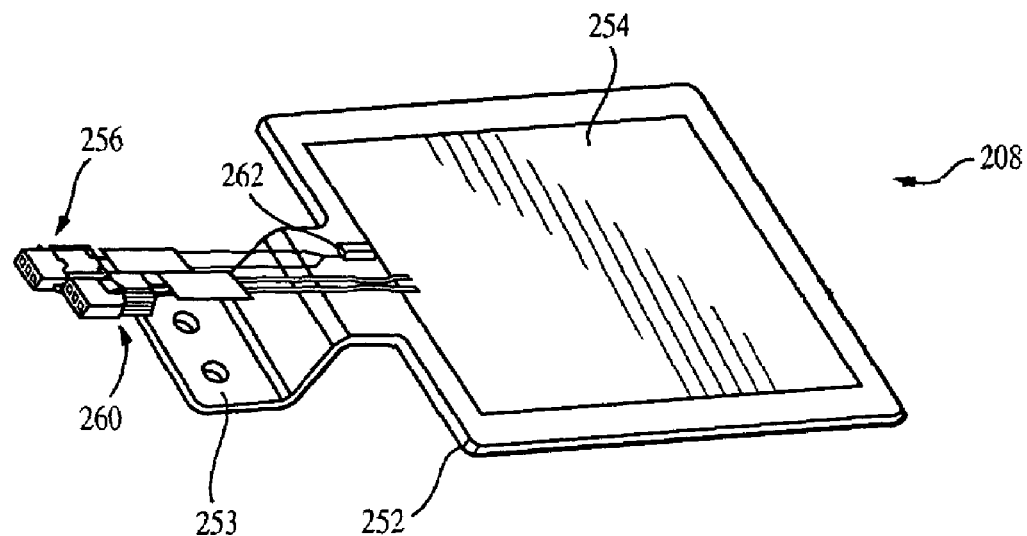
FIG. 11 is a partial, perspective view of an embodiment of an end plate.
Figure 12:
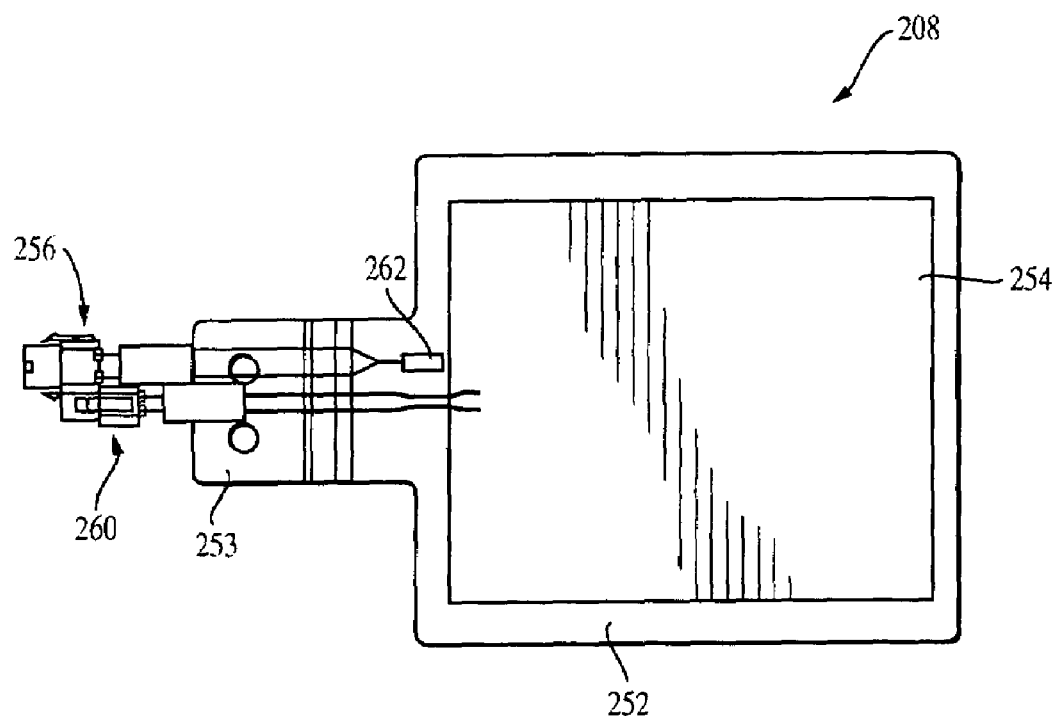
FIG. 12 is a plan view of the end plate of FIG. 11.
Figure 13:
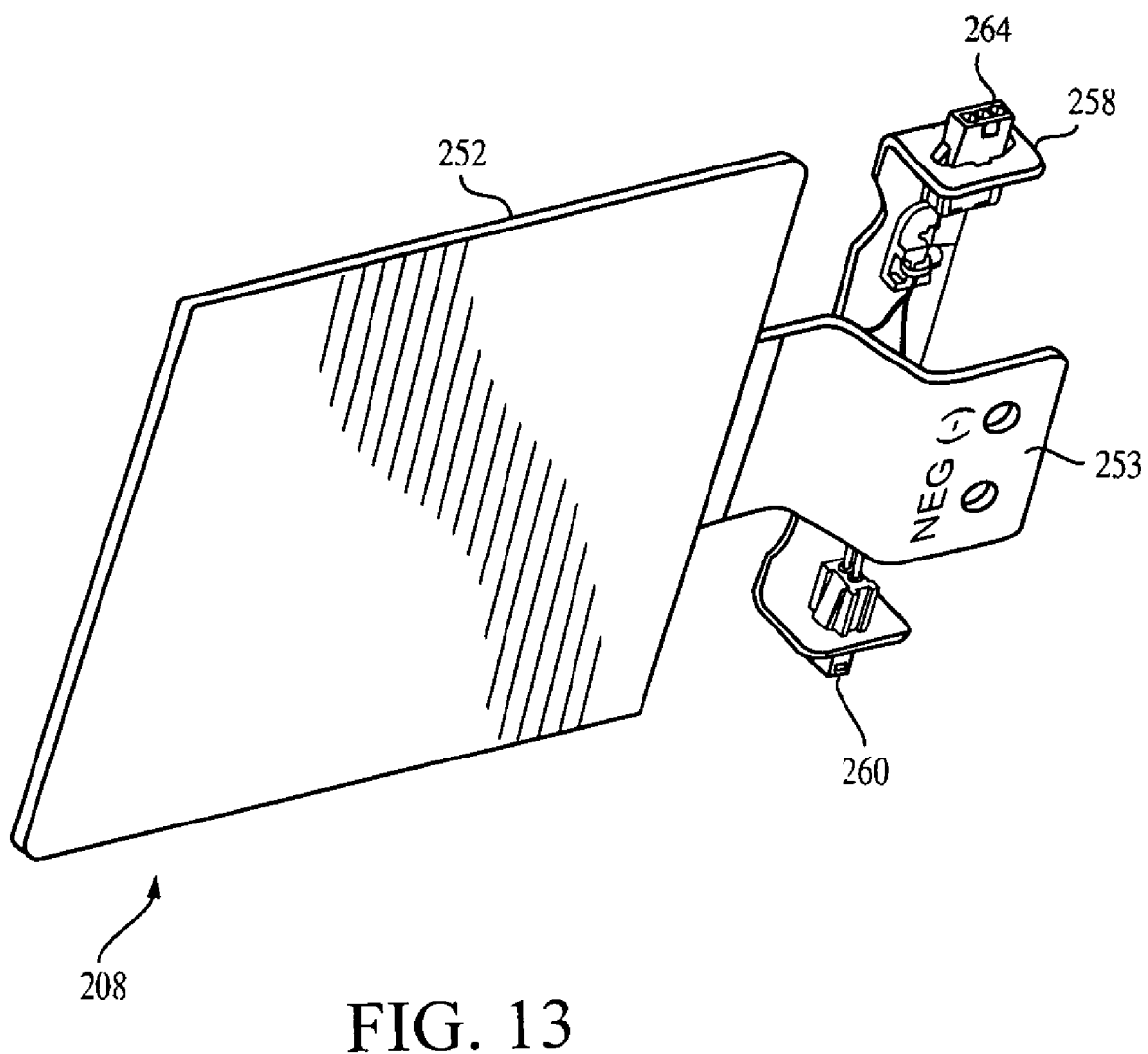
FIG. 13 is a perspective view of the assembled end plate of FIG. 11.
Figure 14:
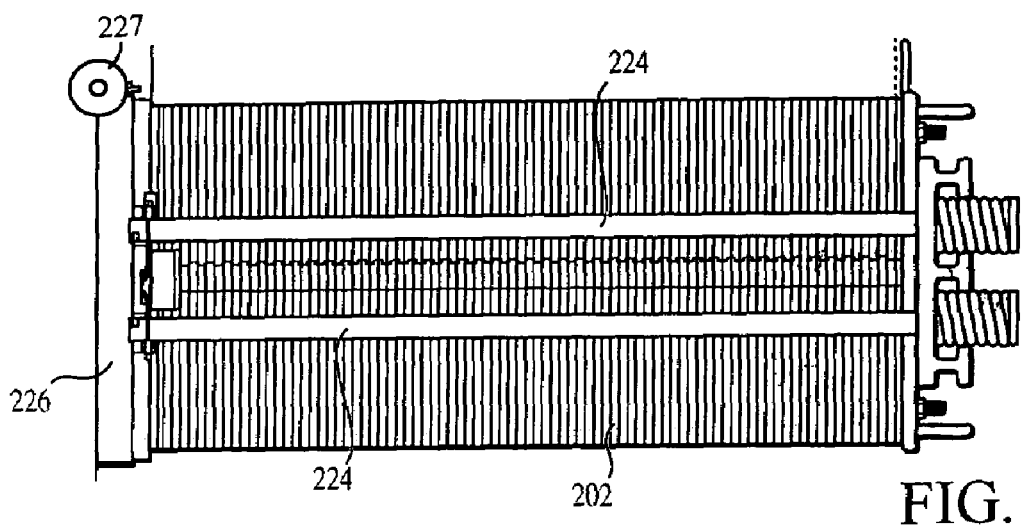
FIG. 14 is a side view of the assembled fuel cell assembly of FIG. 10.
Figure 15:
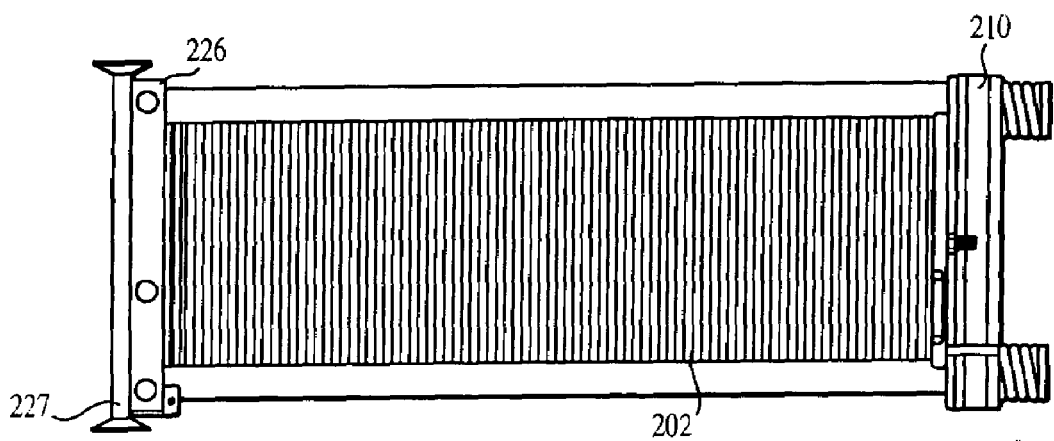
FIG. 15 is a side view of the assembled fuel cell assembly of FIG. 10.

FIGS. 11–13 show an embodiment of heatable current collector plate 208. Generally, collector plate 208 is configured to substantially correspond to the active area of fuel cell stack 202, similar to the flow channels described above. Heatable collector plate 208 includes a collector body 252 defining a negative electrical contact 253, a resistive thermal device (RTD) 254, and a temperature sensor assembly 256. Collector body 252 is made of a solid, thermally conductive material, such as gold-coated copper, that can tolerate the relatively hot and humid conditions inside a fuel cell assembly. Collector body 252 can be attached to a connector bracket 258 (FIG. 13), which is used to mount portions of resistive thermal device 254 and sensor assembly 256, described below.

Resistive thermal device 254 is attached to collector body 252 to heat collector plate 208 and, therefore, end plate 226 and entering gases. Device 254 includes a resistive heater attached to a wire and plug assembly 260 that can be mounted on connector bracket 258 (FIG. 13). The resistive heater can be, for example, a flexible Kapton® polyimide sheet having resistive heating elements or wires embedded therein, such as those commercially available from Minco Products, Inc. (Minneapolis, Minn.). Wire and plug assembly 260 is interfaced with a power source that is interfaced with a controller, e.g., a computer.

Temperature sensor assembly 256 is used to detect the temperature of collector plate 208. Sensor assembly 256 includes a sensor 262, e.g., a thermocouple, attached to a wire and plug assembly 264. Sensor 262 is attached to collector body 252, preferably relatively close to resistive thermal device 254 to provide an accurate temperature reading of collector plate 208. Wire and plug assembly 264 mounts to connector bracket 258 and is interfaced with the controller. Temperature sensor assembly 256 is also commercially available from Minco Products, Inc. (Minneapolis, Minn.).

In operation, temperature sensor assembly 256 provides an input of the temperature of collector plate 208 to the controller. In response to a detected temperature input from sensor assembly 256, the controller controls the power source to provide power to resistive temperature device 254 as needed to maintain collector plate 208 at a predetermined temperature, e.g., about 64° C., thereby heating end plate 226 and entering saturated fuel and/or oxidant gases and minimizing condensation of water on cell 1.

In other embodiments, fuel cell assembly 200 can include any of the embodiments of heatable end plates described above, e.g., end plates 120, 140, 160, and 180. For example, blind end plate 210 and/or service end plate 226 can define one or more flow channels and/or include heating element(s) 181.

In certain embodiments, the fuel cell systems described above may include one or more sensors interfaced to detect one or more operating parameters of the fuel cell system. The detected parameter(s) may be inputted to the controller, which can then control heating of the end plate(s) and/or collector plate(s) according to a predetermined operation, e.g., as in a continuous or intermittent feedback loop. For example, the sensor(s) can be configured to detect parameters such as temperature of the fuel cell stack, temperature of the end plate(s), flow of reactant(s), pressure of reactant(s), power output, and water condensation levels. The controller can adjust heating of the end plate(s) and/or collector plate(s) to operate within predetermined conditions, e.g., more heating at low power output. In certain embodiments, the detected parameters may be used to manually adjust heating of the end plate(s) and/or collector plate(s).

In some embodiments, cell N of a fuel cell stack may not experience the same degree of heat loss that cell 1 may experience. The heat-generating cathode of cell N is adjacent to the blind end plate to provide heating at the blind end of the fuel cell stack. Also, the mass consumption of gases on the cathode (which can be about twice that of the anode side) is relatively high to help transport condensed water away. As a result, cell N may not experience a cell tripping problem. Nevertheless, fuel cell assembly 200 may include a heatable blind collector plate 214, generally as described above for heatable collector plate 208. A heatable blind collector plate may be used with or without a heatable blind end plate, and with or without a heatable service collector plate.

A heatable end plate can be located between a fuel cell stack and a heatable service collector plate 214 or a heatable blind collector plate. Heatable elements, e.g., heatable collector plates, can be positioned adjacent one or more sides, with or without heatable elements adjacent to the top and/or bottom ends, of a fuel cell stack to minimize heat loss and fluid condensation. Thus, heatable elements may be used to heat any and all combinations of outer peripheries defined by the fuel cell stack.

A fuel cell assembly may include multiple heatable service collector plates and/or multiple heatable blind collector plates.

While the heatable collector plates described above are resistively heated, other methods of heating can be used, such as chemical heating, other methods of electrical heating, using reflective materials, magnetic heating, mechanical heating, and electromagnetic heating.

Other embodiments are within the claims.

What is claimed is:

1. A method of operating a fuel cell system comprising a fuel cell stack and a plurality of fuel cells associated with the fuel cell stack, the method comprising:
    monitoring voltages of a set of fuel cells; and
    restricting coolant flow through the fuel cell stack when one or more of the monitored voltages decreases from a predetermined voltage range,
    wherein:
    the fuel cell system further comprises a first end plate associated with a first end of the fuel cell stack, and
    the method further comprises heating the first end plate.
2. The method of claim 1, further comprising unrestricting coolant flow through the fuel cell stack.
3. The method of claim 2, wherein restricting and unrestricting coolant flow are performed as a function of time.
4. The method of claim 2, wherein restricting and unrestricting coolant flow are performed to cause the voltages of a set of fuel cells to be a predetermined level.
5. The method of claim 4, wherein the predetermined level is within about 15% of the voltages of a set of fuel cells under normal operation of the fuel cell system.
6. The method of claim 1, wherein heating the first end plate comprises heating a first heating element different than the first end plate.
7. The method of claim 6, wherein the first heating element is adjacent to the first end plate.
8. The method of claim 6, wherein the first heating element is disposed between the first end plate and the fuel cell stack.
9. The method of claim 1, further comprising:
    flowing a fluid through a flow channel defined by the first end plate.
10. The method of claim 9, wherein the fluid is heated.
11. The method of claim 1, further comprising:
    heating the first end plate with a heating element disposed on the first end plate.
12. The method of claim 1, wherein the heating is performed electrically.
13. The method of claim 1, further comprising:
    heating a second end plate associated with the fuel cell stack.
14. The method of claim 13, wherein heating the second end plate comprises heating a second heating element different than the second end plate.
15. The method of claim 14, wherein the second heating element is adjacent to the second end plate.
16. The method of claim 14, wherein the second heating element is between the second end plate and the fuel cell stack.
17. The method of claim 1, wherein the method is performed as a feedback loop.
18. A method of operating a fuel cell system comprising a fuel cell stack and a plurality of fuel cells associated with the fuel cell stack, the method comprising:
    monitoring voltages of a set of fuel cells; and restricting coolant flow through the fuel cell stack when one or more of the monitored voltages decreases from a predetermined voltage range.

19. The method of claim 18, wherein the set of fuel cells includes all the fuel cells associated with the fuel cell stack.

20. The method of claim 18, wherein restricting coolant flow is performed when one or more of the monitored voltages deviate by more than about 10% from an operating voltage under normal operation of the fuel cell system.

21. The method of claim 18, further comprising unrestricting coolant flow through the fuel cell stack.

22. The method of claim 21, wherein unrestricting coolant flow is performed when the monitored voltages are in the predetermined voltage range.

23. The method of claim 21, wherein unrestricting coolant flow is performed after a predetermined time of restricting coolant flow.

24. The method of claim 18, wherein the fuel cell stack further comprises a first end plate associated with the fuel cell stack, the method further comprising:
monitoring an operating parameter of the fuel cell system; and
adjusting a temperature of the first end plate based on the operating parameter.

25. The method of claim 24, wherein adjusting the temperature comprises heating a first heatable element.

26. The method of claim 24, wherein adjusting the temperature comprises flowing a fluid through the first end plate.

27. The method of claim 24, further comprising:
adjusting a temperature of a second end plate associated with the fuel cell stack based on the operating parameter.

28. The method of claim 24, wherein the operating parameter is a power output of the fuel cell system.

29. The method of claim 24, wherein the operating parameter is a temperature of the fuel cell stack.

30. The method of claim 25, wherein the operating parameter is a temperature of the first heatable element.

31. The method of claim 25, wherein the heatable element is adapted to heat an outer periphery of the fuel cell stack.

32. The method of claim 18, wherein the method is performed as a feedback loop.

* * * * *